(12) United States Patent
Myeong et al.

(10) Patent No.: US 10,921,816 B2
(45) Date of Patent: Feb. 16, 2021

(54) METHOD AND APPARATUS FOR PRODUCING MAP BASED ON HIERARCHICAL STRUCTURE USING 2D LASER SCANNER

(71) Applicant: Korea Advanced Institute of Science and Technology, Daejeon (KR)

(72) Inventors: Hyeon Myeong, Yuseong-gu (KR); Hyungjin Kim, Yuseong-gu (KR); Kwang Yik Jung, Yuseong-gu (KR); Seungwon Song, Yuseong-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 319 days.

(21) Appl. No.: 15/852,094

(22) Filed: Dec. 22, 2017

(65) Prior Publication Data

US 2018/0307232 A1    Oct. 25, 2018

(30) Foreign Application Priority Data

Apr. 21, 2017  (KR) .................. 10-2017-0051631
Oct. 24, 2017  (KR) .................. 10-2017-0138077

(51) Int. Cl.
*G05D 1/02*    (2020.01)
*B25J 19/02*   (2006.01)
(Continued)

(52) U.S. Cl.
CPC ............ *G05D 1/024* (2013.01); *B25J 9/1676* (2013.01); *B25J 9/1684* (2013.01); *B25J 9/1697* (2013.01);
(Continued)

(58) Field of Classification Search
CPC .... G05D 1/024; G05D 1/0272; G05D 1/0259; B25J 9/1676; B25J 9/1684; B25J 9/1697;
(Continued)

(56) References Cited

U.S. PATENT DOCUMENTS 5,677,836 A * 10/1997 Bauer ................. A47L 11/4011
                                                        701/23
2005/0194973 A1* 9/2005 Kwon ................. G05D 1/0274
                                                        324/260

(Continued)

FOREIGN PATENT DOCUMENTS

CN    103198751 A *  7/2013
CN    103325296 A *  9/2013
(Continued)

OTHER PUBLICATIONS

Zhang, He, et al. "A graph-based hierarchical SLAM framework for large-scale mapping." International Conference on Intelligent Robotics and Applications. Springer, Berlin, Heidelberg, 2012. (Year: 2012).*

(Continued)

*Primary Examiner* — Dale Moyer
(74) *Attorney, Agent, or Firm* — Christensen O'Connor Johnson Kindness PLLC

(57) ABSTRACT

An apparatus and method for producing a map based on a hierarchical structure to produce a 3D high-precision map based on the hierarchical structure using a low-priced 2D laser scanner is provided. The apparatus and method produces the 3D high-precision map based on the hierarchical structure using the low-priced 2D laser scanner.

16 Claims, 13 Drawing Sheets

(51) Int. Cl.
*B25J 9/16* (2006.01)
*G01S 17/89* (2020.01)
*G01S 17/86* (2020.01)
*G01S 17/931* (2020.01)

(52) U.S. Cl.
CPC ............. *B25J 19/022* (2013.01); *G01S 17/86* (2020.01); *G01S 17/89* (2013.01); *G05D 1/0259* (2013.01); *G05D 1/0272* (2013.01); *G01S 17/931* (2020.01)

(58) Field of Classification Search
CPC ...... B25J 9/022; G01S 17/023; G01S 17/026; G01S 17/89; G01S 17/936
See application file for complete search history.

(56) References Cited

U.S. PATENT DOCUMENTS

| | | | | |
|---|---|---|---|---|
| 2011/0166737 A1* | 7/2011 | Tanaka | ................. | G05D 1/0274 701/25 |
| 2011/0178668 A1* | 7/2011 | Tanaka | ................. | G09B 29/106 701/25 |
| 2014/0005933 A1* | 1/2014 | Fong | .................... | G05D 1/0274 701/447 |
| 2015/0304634 A1* | 10/2015 | Karvounis | ........... | H04N 13/239 348/46 |
| 2016/0062361 A1* | 3/2016 | Nakano | ................. | G05D 1/024 701/25 |
| 2018/0161986 A1* | 6/2018 | Kee | .................... | G06K 9/00664 |
| 2020/0306989 A1* | 10/2020 | Vogel | .................. | B25J 11/0085 |

FOREIGN PATENT DOCUMENTS

| | | | | |
|---|---|---|---|---|
| CN | 103631261 A | * | 3/2014 | |
| CN | 103632606 A | * | 3/2014 | |
| CN | 105953798 A | * | 9/2016 | ............. G05D 1/024 |
| KR | 101490055 B1 | | 2/2015 | |
| KR | 101738751 B1 | | 5/2017 | |

OTHER PUBLICATIONS

Haehnel, Dirk, Sebastian Thrun, and Wolfram Burgard. "An extension of the ICP algorithm for modeling nonrigid objects with mobile robots." IJCAI. vol. 3. 2003. (Year: 2003).*

Lee, Yong-Ju, and Jae-Bok Song. "Three-dimensional iterative closest point-based outdoor SLAM using terrain classification." Intelligent Service Robotics 4.2 (2011): 147-158. (Year: 2011).*

Lee, Yong-Ju, Jae-Bok Song, and Ji-Hoon Choi. "Performance improvement of iterative closest point-based outdoor SLAM by rotation invariant descriptors of salient regions." Journal of intelligent & robotic systems 71.3-4 (2013): 349-360. (Year: 2013).*

* cited by examiner

METHOD AND APPARATUS FOR PRODUCING MAP BASED ON HIERARCHICAL STRUCTURE USING 2D LASER SCANNER

CROSS-REFERENCE TO RELATED APPLICATIONS

A claim for priority under 35 U.S.C. § 119 is made to Korean Patent Application No. 10-2017-0138077 filed on Oct. 24, 2017, in the Korean Intellectual Property Office, the entire contents of which are hereby incorporated by reference.

BACKGROUND

Embodiments of the inventive concept described herein relate to a method and apparatus for producing a map based on a hierarchical structure, and more particularly, relate to technologies for producing a three-dimensional (3D) high-precision map based on a hierarchical structure depending on a movement path of a mobile robot using a low-priced two-dimensional (2D) laser scanner.

Robots have been used as tools for mass production at industrial sites. Robots have performed simple and repeated tasks in fixed locations. With the development of robot technology, robots have more various forms and have the ability to have higher intelligence and perform a variety of writing.

Recently, an autonomous mobile robot has become attractive due to utility and stability. The mobile robot may include unmanned ground vehicles (UGVs) and should have the ability to drive itself to automatically perform various missions.

Further, the mobile robot may generate and produce a map for driving itself and may perform more accurate movement using the generated map or may transmit the generated map to the outside to be linked to an unmanned vehicle based on a location and map, indoor location recognition, 3D map recovery, and the like and provide various services.

Herein, location estimation and mapping technology applied to a conventional mobile robot mainly uses simultaneous localization and mapping (SLAM) technology using a sensing scheme which uses images, lasers, or ultrasonic waves.

In this case, conventional technology uses a high-priced sensor system and a plurality of sensor systems for more accurate location estimation and mapping of a mobile robot. However, such conventional technology has limitation elements in many ways such as cost aspects, complexity by a plurality of sensor systems, and a burden for maintaining accuracy of result data.

PRIOR ART DOCUMENT

Patent Document

Korean Patent No. 10-1490055 (issue date Jan. 29, 2015), "Method for estimating a location of a mobile robot and a map and apparatuses for performing the same"

Korean Patent No. 10-1738751 (issue date May 16, 2017), "Method and apparatus for recognizing a location of a mobile robot using an indoor magnetic field"

SUMMARY

Embodiments of the inventive concept provide a method and apparatus for producing a map based on a hierarchical structure to produce a 3D high-precision map using a low-priced 2D laser scanner.

Embodiments of the inventive concept provide a method and apparatus for producing a map based on a hierarchical structure to accurately generate a 3D map through a local map according to a movement path of a mobile robot and repeated optimization according to an inter-layer correlation between the local map and a global map of a hierarchical structure form.

According to an aspect of an embodiment, a method for generating a map based on a hierarchical structure may include generating a local map based on nodes formed on a movement path of a mobile robot, generating a global map in the form of the hierarchical structure in the local map by grouping the nodes, and producing an optimization map through inter-layer repeated optimization of the local map and the global map.

The generating of the local map may include forming the nodes using sensor information measured from a two-dimensional (2D) push-broom light detection and ranging (LiDAR) of the mobile robot according to the movement path and odometry information of the mobile robot.

The generating of the local map may include generating the local map of a graph-structure using a node constraint of the nodes accumulated according to movement of the mobile robot.

The generating of the global map may include forming super nodes by grouping the nodes, which form the local map, at a predetermined interval and generating the global map by connecting the formed super nodes.

The generating of the global map may include generating the global map using a loop closing constraint of the super nodes.

The producing of the optimization map may include performing optimization of one of the local map and the global map using a hierarchical constraint and performing optimization of the other.

The producing of the optimization map may include producing a three-dimensional (3D) optimization map by performing optimization by applying the performed optimization of one of the local map and the global map to the other.

According to another aspect of an embodiment, a method for generating a map based on a hierarchical structure may include generating a local map based on nodes formed on a movement path of a mobile robot and generating a global map in the form of the hierarchical structure by grouping the nodes, performing inter-layer repeated optimization of the local map and the global map, and producing an optimization map based on a local map generated again according to the optimization.

The performing of the inter-layer repeated optimization may include performing optimization of one of the local map and the global map using a hierarchical constraint and performing optimization of the other.

The producing of the optimization map may include, after the optimization for the local map and the global map is performed, removing a node constraint included in the generated local map and producing a 3D optimization map from the local map generated again, using a change node constraint between nodes changed according to the optimization.

According to another aspect of an embodiment, an apparatus for generating a map based on a hierarchical structure may include a map generator configured to generate a local map based on nodes formed on a movement path of a mobile robot and generate a global map in the form of the hierarchical structure form by grouping the nodes and an optimization performing unit configured to produce an optimization map by performing inter-layer repeated optimization of the local map and the global map.

The map generator may be configured to generate the local map of a graph-structure using a node constraint of the nodes accumulated from sensor information measured from a 2D push-broom LiDAR of the mobile robot according to the movement path and odometry information of the mobile robot.

The map generator may be configured to form super nodes by grouping the nodes, which form the local map, at a predetermined interval and generate the global map using a loop closing constraint of the formed super nodes.

The optimization performing unit may be configured to produce a 3D optimization map by performing optimization of one of the local map and the global map using a hierarchical constraint and performing optimization of the other.

The map generator may be configured to, after the optimization for the local map and the global map is performed, remove a node constraint included in the generated local map and generate a local map again using a change node constraint between nodes changed according to the optimization. The optimization performing unit may be configured to produce the 3D optimization map from the local map generated again.

The apparatus may further include an encoder configured to obtain odometry information of the mobile robot. The map generator may be configured to generate the local map based on the obtained odometry information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
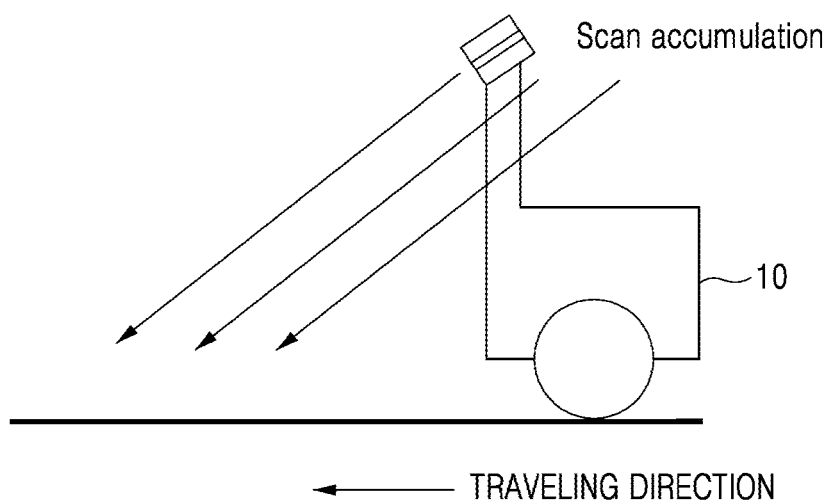
FIGS. 1A, 1B, and 1C are drawings illustrating an example of a movement path of a mobile robot and a generated local map according to an embodiment of the inventive concept.

Hereinafter, a description will be given in detail of embodiments with reference to the accompanying drawings. However, the present disclosure is restricted or limited to embodiments of the present disclosure. Further, like reference numerals shown in each drawing indicates like members.

Further, the terminology used in the specification may be terms used to properly represent an exemplary embodiment of the present disclosure and may vary according to intention of a user or an operator or custom of a field included in the present disclosure. Therefore, the terminology will be defined based on contents across the specification.

Figure 1B:
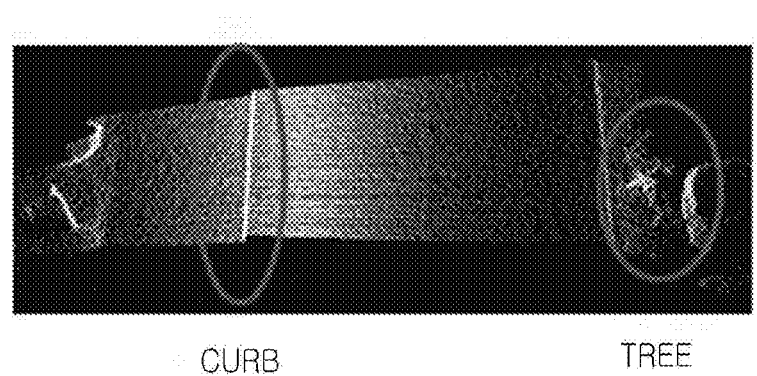
Figure 1C:
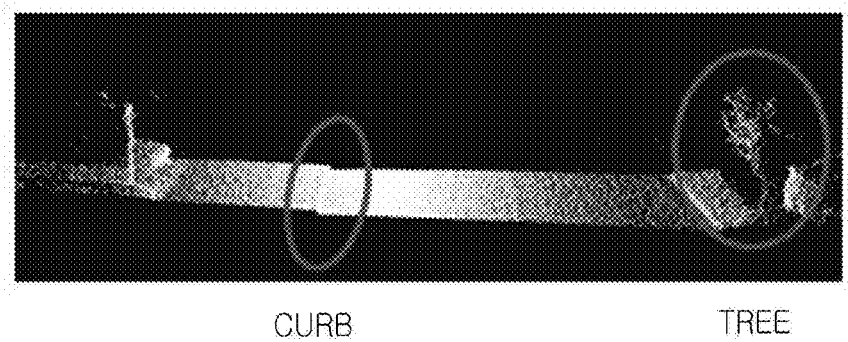

FIGS. 1A to 1C are drawings illustrating an example of a movement path of a mobile robot and a generated local map according to an embodiment of the inventive concept.

In detail, FIG. 1A illustrates an example of a mobile robot which accumulates data along a movement path. Referring to FIG. 1A, a mobile robot 10 may move in a traveling direction on a movement path and may measure sensor information.

In this case, the mobile robot 10 may include a 2D push-broom light detection and ranging (LiDAR) and may perform scan accumulation of measuring sensor information at intervals of a predetermined time along a movement path using the 2D push-broom LiDAR and accumulating data.

In addition, the mobile robot 10 may obtain odometry information (or odometry data) using an encoder. In this case, the encoder may detect a rotation speed and a rotation direction of a motorized wheel of the mobile robot 10 and may obtain the odometry information of the mobile robot 10 using the detected rotation speed and direction. The odometry information may include an x-axis coordinate of the mobile robot 10, a y-axis coordinate of the mobile robot 10, and an angle of a traveling direction of the mobile robot 10.

Thus, the mobile robot 10 may form a plurality of nodes using sensor information measured from the 2D push-broom LiDAR on a movement path and the odometry information. In this case, the plurality of nodes may be formed based on a location of the mobile robot 10 at a time when the sensor information and the odometry information are collected.

FIG. 1B illustrates an example of a local map generated through accumulation of sensor information measured along a movement path of the mobile robot 10. FIG. 1C illustrates an example of a local map matched by applying an iterative closest point (ICP) algorithm to a local map generated in FIG. 1B.

Referring to FIG. 1C, it may be verified that sensor information measured along a movement path of the mobile robot 10 is accumulated and that a 3D local map is generated using a 3D ICP algorithm. A 3D curb and tree may be verified through matching of the 3D ICP algorithm.

Figure 2:
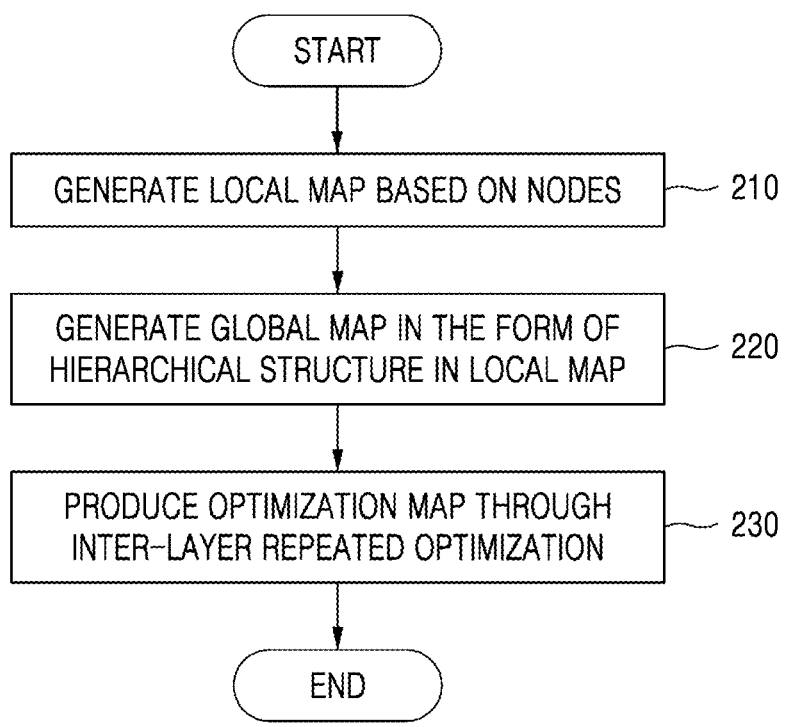
FIG. 2 is a flowchart illustrating a method for producing a map based on a hierarchical structure according to an embodiment of the inventive concept.

FIG. 2 is a flowchart illustrating a method for producing a map based on a hierarchical structure according to an embodiment of the inventive concept.

The method shown in FIG. 2 may be performed by an apparatus for producing a map based on a hierarchical structure, which will be described with reference to FIG. 8.

Referring to FIG. 2, in operation 210, a local map may be generated based on nodes formed on a movement path of a mobile robot.

For example, the mobile robot may include a 2D push-broom LiDAR and may perform scan accumulation of measuring sensor information at intervals of a predetermined time along its movement path using the 2D push-broom LiDAR and accumulating data, thus obtaining its odometry information (or its odometry data) from an encoder. In this case, operation 210 may be an operation of forming a plurality of nodes along a movement path based on the sensor information and the odometry information.

Herein, the plurality of nodes may be formed based on a location of the mobile robot at a time when the sensor information and the odometry information are collected. The time when the information is collected may be preset and repeated. Herein, since the time when the information is repeatedly collected is set by a manager or a user who manages the mobile robot, it is not limited thereto.

In operation 210 may be an operation of generating a graph-structure local map including a plurality of nodes indicating a location of the mobile robot and an edge indicating a node constraint between the plurality of nodes. Herein, the node constraint may be an odometry constraint generated based on odometry information obtained by the encoder. Further, the local map may be generated by one or more of a loop closing constraint and a rotation constraint other than the odometry constraint.

In this case, operation 210 may be an operation of obtaining a correlation by applying the 3D ICP algorithm to the generated local map and matching a 3D local map according to the obtained result.

In operation 220, a global map of a hierarchical structure form may be generated in the local map by grouping the nodes.

For example, operation 220 may be an operation of forming super nodes by grouping the plurality of nodes, which form the local map, at a predetermined interval or depending on a predetermined number and generating a global map by connecting the formed super nodes. In this case, operation 220 may be an operation of generating a global map including a plurality of super nodes and an edge indicating a loop closing constraint between the plurality of super nodes.

Herein, the loop closing constraint may be generated based on magnetic field values measured for nodes formed on a movement path of the mobile robot. Operation 220 may be an operation of forming super nodes by grouping the plurality of formed nodes and generating the loop closing constraint by comparing and matching magnetic field values measured for the formed super nodes with a magnetic field value for a predefined super node.

In operation 230, an optimization map may be produced through inter-layer repeated optimization of the local map and the global map.

In this case, the local map and the global map may be hierarchically formed by a hierarchical constraint. Operation 230 may be an operation of optimizing the global map using the 3D ICP algorithm and optimizing the local map. In other words, operation 230 may be an operation of more accurately generating a 3D optimization map by alternately and repeatedly optimizing the global map and the local map and performing optimization by applying the optimization performed in the global map to the local map or by applying the optimization performed in the local map to the global map. In this case, an order where the local map and the global map are optimized is not limited thereto.

Figure 3:
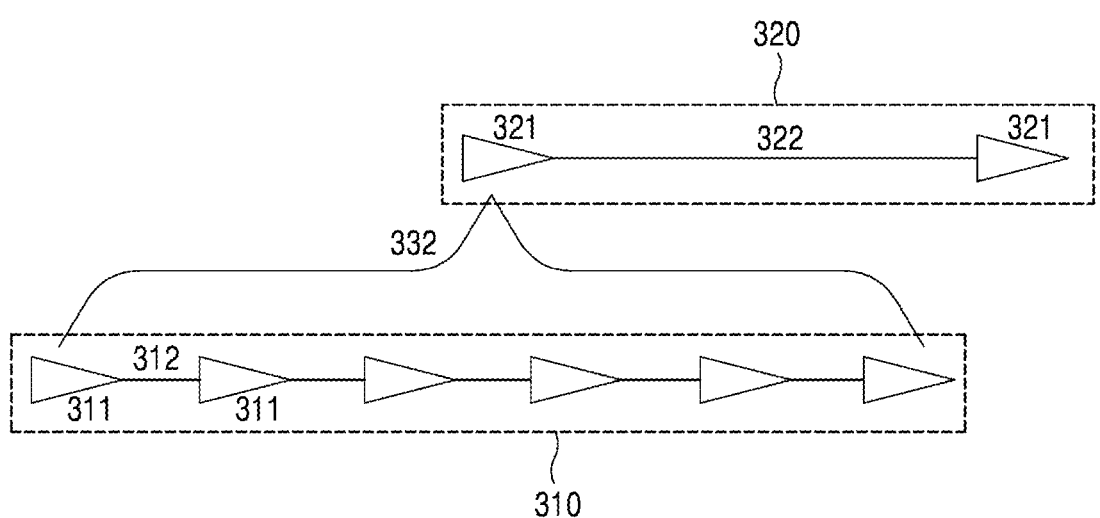
FIG. 3 is a drawing illustrating generating and matching a local map according to an embodiment of the inventive concept.

FIG. 3 is a drawing illustrating generating and matching a local map according to an embodiment of the inventive concept.

Referring to FIG. 3, a local map 310 may indicate simultaneous localization and mapping (SLAM) based on a graph-structure including nodes 311 and a node constraint between the nodes 311.

The nodes 311 may be formed by sensor information measured from a 2D push-broom LiDAR included in a mobile robot and odometry information (or odometry data) of the mobile robot. In this case, the local map 310 may be generated by representing and accumulating the sensor information and the odometry information as the nodes 311.

Further, a global map 320 may indicate SLAM based on a graph-structure including super nodes 321 formed by grouping the plurality of nodes 311, which form the local map 310, at a predetermined interval or depending on a predetermined number and a loop closing constraint 322 between the formed super nodes 321.

In this case, the local map 310 and the global map 320 may be formed based on a hierarchical structure by a hierarchical constraint 322.

Figure 4A:
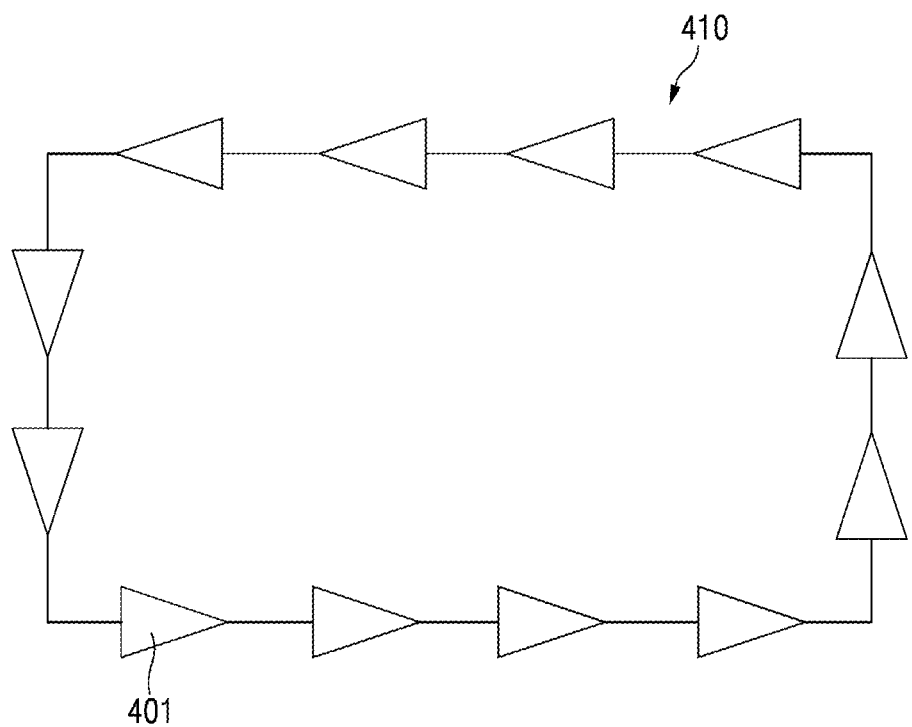
FIGS. 4A, 4B, and 4C are drawings illustrating optimization of a global map according to an embodiment of the inventive concept.
Figure 4B:
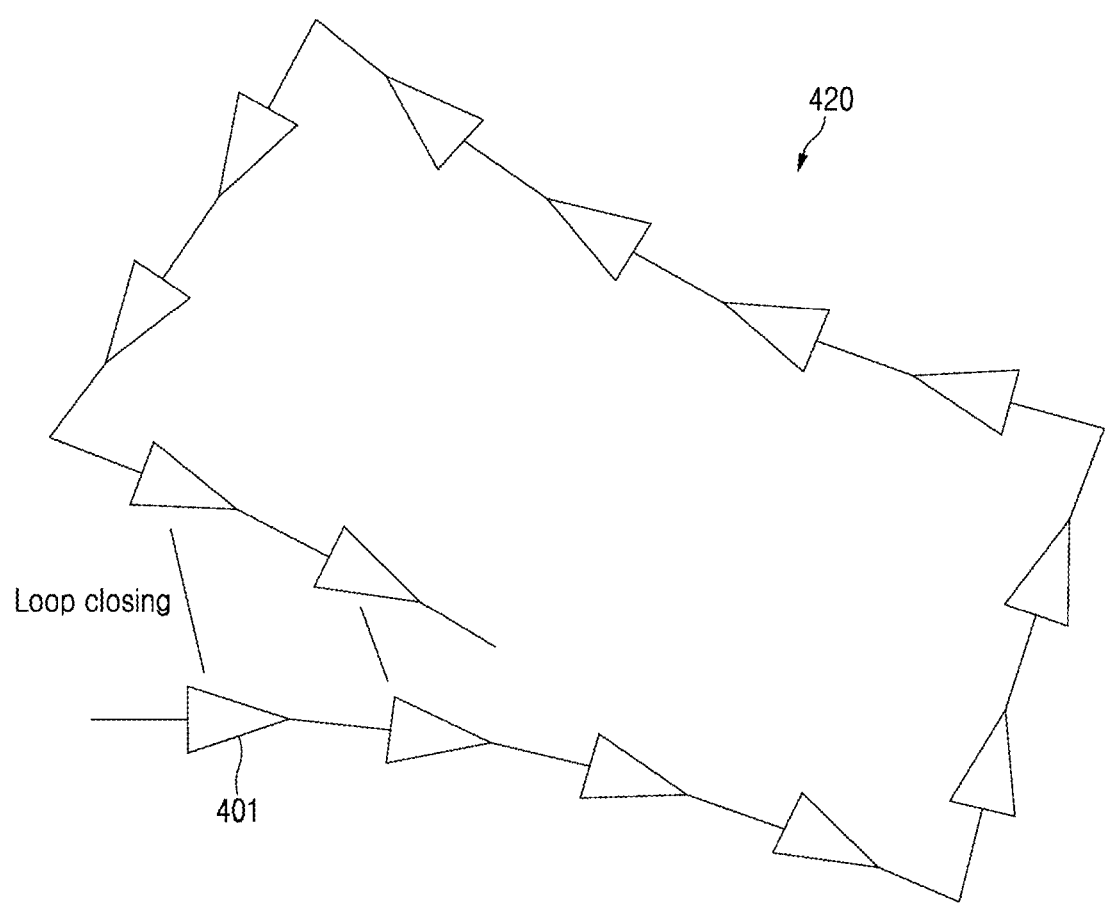
Figure 4C:
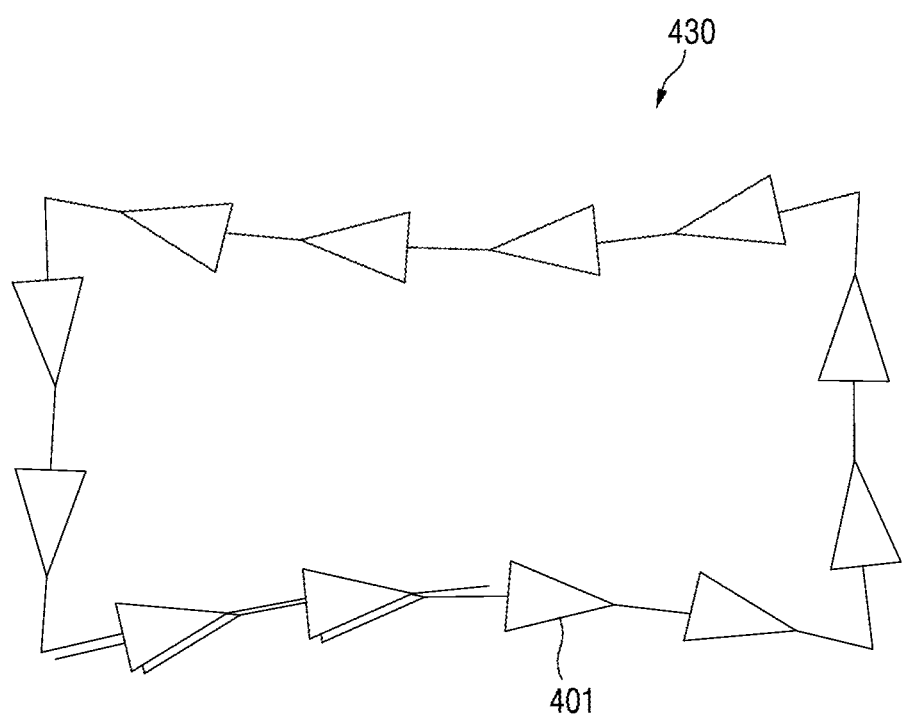

FIGS. 4A to 4C are drawings illustrating optimization of a global map according to an embodiment of the inventive concept.

In detail, FIG. 4A illustrates an example of a basic global map. FIG. 4B illustrates an example of a measured global map. FIG. 4C illustrates an example of an optimized global map.

Referring to FIG. 4A, the basic global map 410 may include a plurality of super nodes 401 connected by a loop closing constraint. The super nodes 401 may be formed by a plurality of nodes which form a local map.

In this case, the plurality of nodes may be formed based on odometry information and sensor information according to movement of a mobile robot. The local map may be generated based on an odometry constraint and a rotation constraint which are obtained on a straight path or a curved path of the mobile robot.

The odometry constraint may refer to a constraint generated based on odometry information obtained by an encoder. The rotation constraint may refer to a constraint generated based on a magnetic field value measured while the mobile robot rotates. The loop closing constraint may refer to a constraint generated based on magnetic field values measured for nodes formed on a movement path of the mobile robot.

Herein, according to an embodiment, a local map may be generated using only both of the odometry constraint and the loop closing constraint depending on a situation. Alternatively, a local map may be generated using only both of the odometry constraint and the rotation constraint depending on a situation. Alternatively, a local map may be generated using all of the odometry constraint, the loop closing constraint, and the rotation constraint depending on a situation.

In addition, nodes may be formed only if the mobile robot drives on a straight section, and a rotation constraint may be generated if the mobile robot rotates in a stop state during driving. Assuming that a magnetic field vector measured while the mobile robot rotates in a stop state is kept constant on global coordinates, the rotation constraint may be generated. In other words, since the mobile robot rotates together with a magnetic field sensor when it rotates, a constraint for a rotation angle of the mobile robot may be generated using a relationship between magnetic field vectors measured before and after the rotation.

In other words, assuming that the mobile robot moves on a 2D plane, if the mobile robot rotates without any translational displacement, since a magnetic field vector indicated in a global coordinate frame is not changed, a rotation constraint may be generated by using measurement characteristics of a magnetic field in a specific condition.

Herein, according to an embodiment, the rotation constraint may be generated in a process where the mobile robot which drives on a straight road changes a direction. For example, the mobile robot which drives on a straight road may change its direction to the left or the right (irrespective of an angle) to obtain sensor information and odometry information, may detect rotation from a plurality of nodes formed as a result, and may generate a rotation constraint of connecting the plurality of nodes including the rotated node. In other words, the rotation constraint may be generated based on a magnetic field vector or a location of a node.

Thus, each of global maps 410, 420, and 430 shown in FIGS. 4A to 4C may include formed nodes and a straight path and a curved path of the mobile robot based on the odometry constraint, the rotation constraint, and the loop closing constraint.

Referring to FIG. 4B, it may be verified that the measured global map 420 decreases in accuracy due to an error included in odometry information of a local map.

Thereafter, referring to FIG. 4C, it may be verified that the optimized global map 430 increases in matching accuracy by optimizing the loop-closed super nodes 401 of the measured global map 420.

In other words, the method and apparatus for producing the map based on the hierarchical structure according to an embodiment of the inventive concept may enhance matching accuracy of the map by minimizing an error included in the map through optimization of a local map and a global map.

Figure 5:
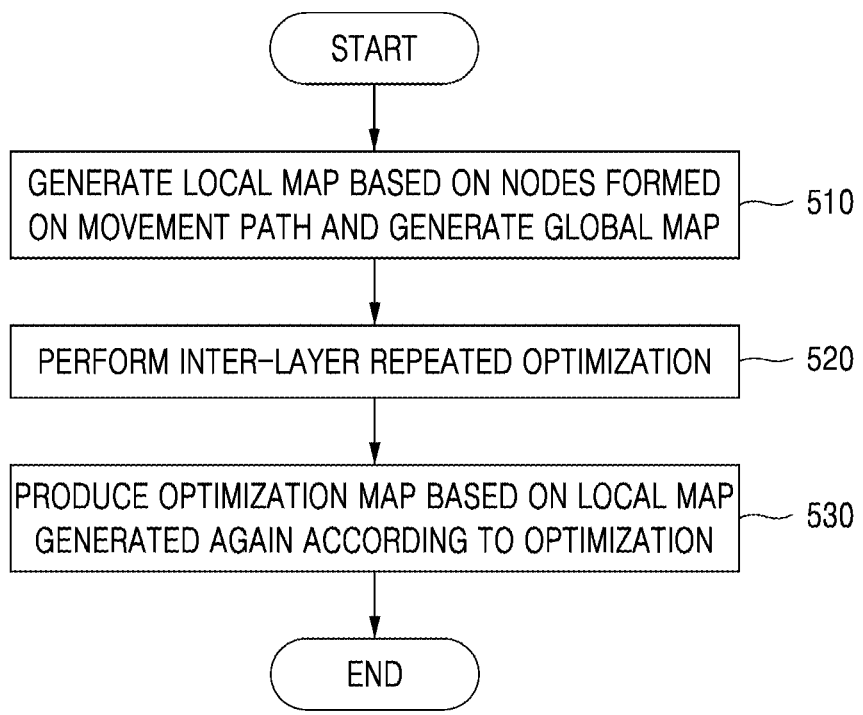
FIG. 5 is a flowchart illustrating a method for producing a map based on a hierarchical structure according to an embodiment of the inventive concept.

FIG. 5 is a flowchart illustrating a method for producing a map based on a hierarchical structure according to an embodiment of the inventive concept.

The method shown in FIG. 5 may be performed by an apparatus for producing a map based on a hierarchical structure described with reference to FIG. 8.

In operation 510, a local map may be generated based on nodes formed on a movement path of a mobile robot and a global map of a hierarchical structure form may be generated by grouping the nodes.

In operation 520, inter-layer repeated optimization of the local map and the global map may be performed.

Herein, since the description of operations 510 and 520 is identical to contents of operations 210, 220, and 230 of a method for producing a map based on a hierarchical structure according to an embodiment of the inventive concept described above with reference to FIG. 2, it will be omitted.

In operation 530, an optimization map may be produced based on a local map generated again according to the optimization.

For example, operation 520 may be an operation of performing optimization of one of the local map and the global map using a hierarchical constraint and performing optimization of the other. Operation 530 may be an operation of, after the optimization for the local map and the global map is performed, removing a node constraint included in the generated local map and producing a 3D optimization map from a local map generated again using a change node constraint between nodes changed according to the optimization.

Hereinafter, a description will be given in detail of operation 530 with reference to FIGS. 6A to 6C.

Figure 6A:
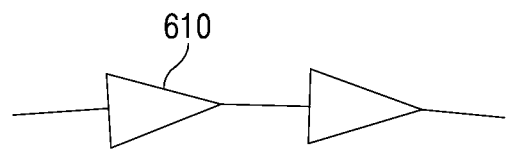
FIGS. 6A, 6B, and 6C are drawings illustrating optimization of a local map and a global map based on a hierarchical structure according to an embodiment of the inventive concept.
Figure 6B:
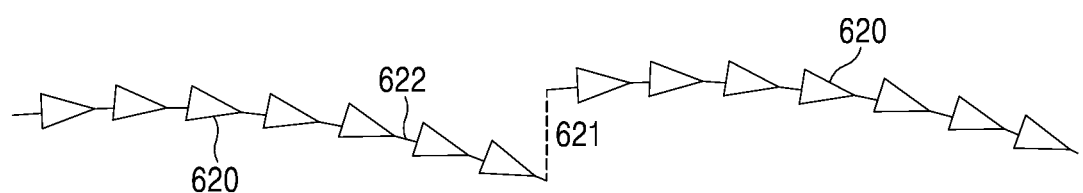
Figure 6C:
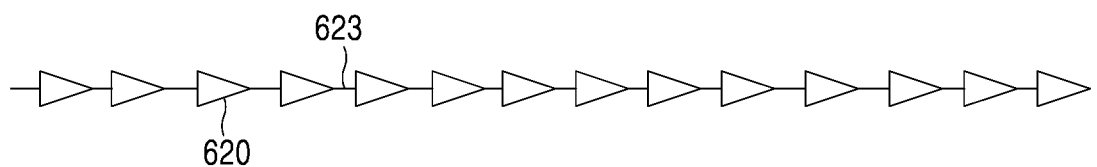

FIGS. 6A to 6C are drawings illustrating optimization of a local map and a global map based on a hierarchical structure according to an embodiment of the inventive concept.

Referring to FIG. 6A, super nodes 610 which form a global map may be formed by a combination of a plurality of nodes 620 which form a local map and may include an error included in the nodes 620.

Thus, referring to FIG. 6B enlarging the super nodes 610, it may be seen that a local map forms a graph-structure including the plurality of nodes 620 and a node constraint 622 between the plurality of nodes 620 and includes an error 621 of odometry information formed on a movement path of a mobile robot. In this case, the node constraint may be an odometry constraint generated by odometry information obtained by an encoder. Further, the local map may be generated by one or more of a loop closing constraint and a rotation constraint other than the odometry constraint.

In this case, in operation 530, a method for producing a map based on a hierarchical structure according to an embodiment of the inventive concept may remove the node constraint 622 included in a local map and may produce a 3D optimization map from a local map generated again using nodes 630 changed according to optimization and a change node constraint 631 between the changed nodes 630.

In detail, in operation 530, the method for producing the map based on the hierarchical structure according to an embodiment of the inventive concept may perform optimization to minimize the error 621 of odometry information included in a local map and may remove the node constraint 622 of connecting the plurality of nodes 620 to minimize or remove the error 621 of the odometry information of FIG. 6B, thus generating a local map based on a graph-structure including the change node constraint 631 again by applying an ICP algorithm to the nodes 630 changed according to optimization of FIG. 6C.

Referring again to FIG. 5, operation 530 of the method for producing the map based on the hierarchical structure according to an embodiment of the inventive concept may be an operation of alternately and repeatedly optimizing the local map generated again and a global map generated again, based on the local map generated again, shown in FIG. 6C to produce a 3D optimization map.

Figure 7A:
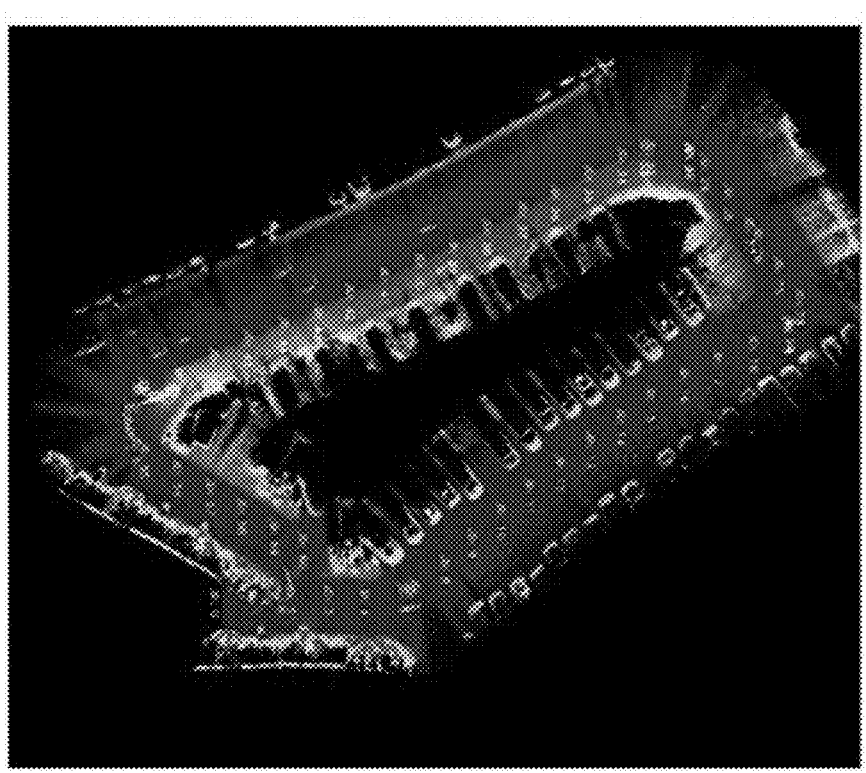
FIGS. 7A and 7B are drawings illustrating a result of an optimization map according to an embodiment of the inventive concept.
Figure 7B:
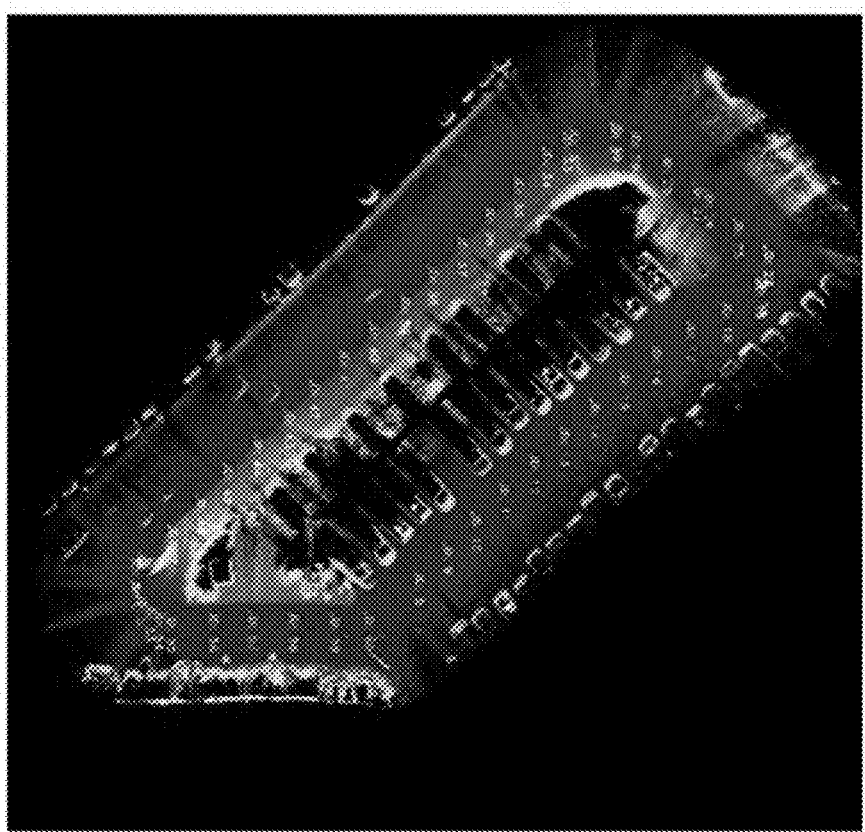

FIGS. 7A and 7B are drawings illustrating a result of an optimization map according to an embodiment of the inventive concept.

In detail, FIG. 7A illustrates an example of a map produced using only odometry information. FIG. 7B illustrates an example of an optimization map produced by performing inter-layer repeated optimization according to an embodiment of the inventive concept.

Referring to FIG. 7A, as described above with reference to FIG. 6B, it may be verified that a map decreases in accuracy due to an error included in odometry information.

In contrast, FIG. 7B illustrates a result of an optimization map produced by performing inter-layer repeated optimization according to an embodiment of the inventive concept. Referring to FIG. 7B, it may be verified that the entire map may increase in accuracy.

In this case, an optimized map produced according to an embodiment of the inventive concept may be produced through inter-layer repeated optimization of a local map and a global map. It may be seen that the entire map increases in accuracy.

Figure 8:
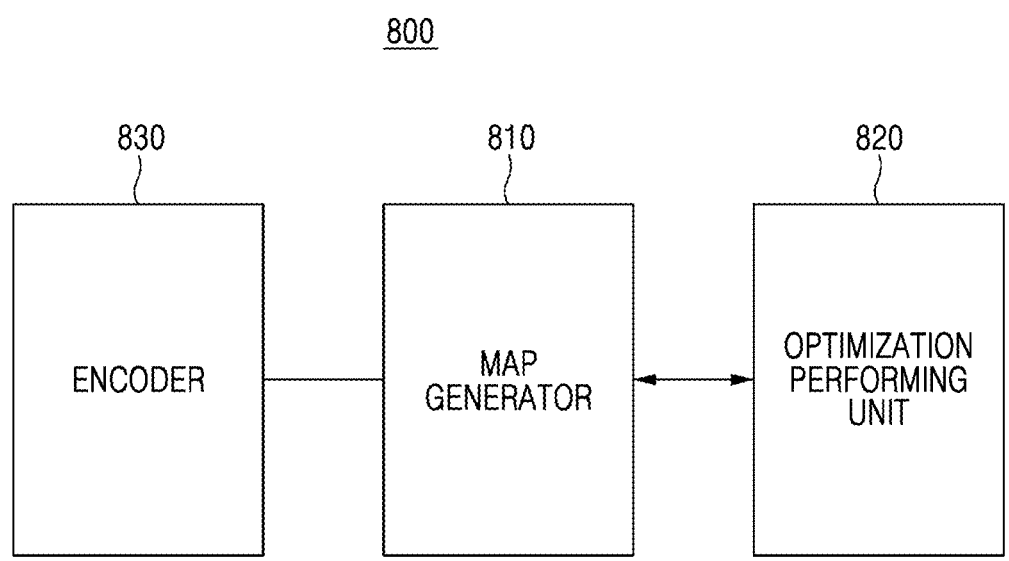
FIG. 8 is a block diagram illustrating an apparatus for producing a map based on a hierarchical structure according to an embodiment of the inventive concept.

FIG. 8 is a block diagram illustrating an apparatus for producing a map based on a hierarchical structure according to an embodiment of the inventive concept.

Referring to FIG. 8, an apparatus 800 for generating a map based on a hierarchical structure according to an embodiment of the inventive concept may produce an optimization map by performing inter-layer repeated optimization of a local map and a global map.

The apparatus 800 for generating the map based on the hierarchical structure according to an embodiment of the inventive concept may include a map generator 810 and an optimization performing unit 820. The apparatus 800 for generating the map based on the hierarchical structure according to an embodiment of the inventive concept may further include an encoder 830.

The encoder 830 of the apparatus 800 for generating the map based on the hierarchical structure according to an embodiment of the inventive concept may obtain odometry information (or odometry data) of a mobile robot and may provide the obtained odometry information to the map generator 810.

In this case, the encoder 830 may detect a rotation speed and a rotation direction of a motorized wheel of the mobile robot and may obtain the odometry information of the mobile robot using the detected rotation speed and direction. The odometry information may include an x-axis coordinate of the mobile robot, a y-axis coordinate of the mobile robot, and an angle of a traveling direction of the mobile robot.

The map generator 810 may generate a local map based on nodes formed on a movement path of the mobile robot and may generate a global map in the form of the hierarchical structure by grouping the nodes.

For example, the map generator 810 may perform scan accumulation of measuring sensor information at intervals of a predetermined time along a movement path from the 2D push-broom LiDAR included in the mobile robot and accumulating data, may receive odometry information of the mobile robot from the encoder 830, and may form a plurality of nodes along the movement path based on the sensor information and the odometry information. In this case, the plurality of nodes may be formed based on a location of the mobile robot at a time when the sensor information and the odometry information are collected. The time when the information is collected may be preset and repeated. Herein, since the time when the information is repeatedly collected is set by a manager or a user who manages the mobile robot, it is not limited thereto.

Thereafter, the map generator 810 may generate a local map of a graph-structure including a plurality of nodes indicating a location of the mobile robot and an edge indicating a node constraint between the plurality of nodes. Herein, the node constraint may be an odometry constraint generated based on odometry information obtained by the encoder 830. Further, the local map may be generated by one or more of a loop closing constraint and a rotation constraint other than the odometry constraint.

In this case, the map generator 810 may obtain a correlation by applying a 3D ICP algorithm to the generated local map and may match a 3D local map according to the obtained result.

Further, the map generator 810 may form super nodes by grouping nodes, which form the local map, at a predetermined interval or depending on a predetermined number and may generate a global map by connecting the formed super nodes. In this case, the map generator 810 may generate the global map including a plurality of super nodes and an edge indicating a loop closing constraint between the plurality of super nodes.

Herein, the loop closing constraint may be generated based on magnetic field values measured for nodes formed on a movement path of the mobile robot. The map generator 810 may form super nodes by grouping a plurality of formed nodes and may generate the loop closing constraint by comparing and matching magnetic field values measured for the formed super nodes with a magnetic field value for a predefined super node.

A description will be given in detail of the local map and the global map generated by the map generator 810. The plurality of nodes which form the local map may be formed based on odometry information and sensor information according to movement of the mobile robot. The local map may be generated based on an odometry constraint and a rotation constraint obtained on a straight path or a curved path of the mobile robot.

The odometry constraint may refer to a constraint generated based on odometry information obtained by the encoder 830. The rotation constraint may refer to a constraint generated based on a magnetic field value measured while the mobile robot rotates. The loop closing constraint may refer to a constraint generated based on magnetic field values measured for nodes formed on a movement path of the mobile robot.

Herein, according to an embodiment, the map generator 810 may generate a local map using only both of the odometry constraint and the loop closing constraint depending on a situation. Alternatively, the map generator 810 may generate a local map using only both of the odometry constraint and the rotation constraint depending on a situation. Alternatively, the map generator 810 may generate a local map using all of the odometry constraint, the loop closing constraint, and the rotation constraint depending on a situation.

In addition, the map generator 810 may form nodes only if the mobile robot drives on a straight section and may generate a rotation constraint if the mobile robot rotates in a stop state during driving. Assuming that a magnetic field vector measured while the mobile robot rotates in a stop state is kept constant on global coordinates, the rotation constraint may be generated. In other words, since the mobile robot rotates together with a magnetic field sensor when it rotates, the map generator 810 may generate a constraint for a rotation angle of the mobile robot using a relationship between magnetic field vectors measured before and after the rotation.

In other words, assuming that the mobile robot moves on a 2D plane, if the mobile robot rotates without any translational displacement, since a magnetic field vector indicated in a global coordinate frame is not changed, the map generator 810 may generate a rotation constraint by using measurement characteristics of a magnetic field in a specific condition.

Herein, according to an embodiment, the rotation constraint may be generated in a process where the mobile robot which drives on a straight road changes its direction. For example, the mobile robot which drives on the straight road may change its direction to the left or the right (irrespective of an angle) to obtain sensor information and odometry information, may detect rotation from a plurality of nodes formed as a result, and may generate a rotation constraint of connecting the plurality of nodes including the rotated node. In other words, the rotation constraint may be generated based on a magnetic field vector or a location of a node.

The optimization performing unit 820 may produce an optimization map by performing inter-layer repeated optimization of the local map and the global map.

In this case, the local map and the global map may be hierarchically formed by a hierarchical constraint. The optimization performing unit 820 may optimize the global map using the 3D ICP algorithm and may optimize the local map. In other words, the optimization performing unit 820 may more accurately generate a 3D optimization map by alternately and repeatedly optimizing the global map and the local map and performing optimization by applying the optimization performed in the global map to the local map or by applying the optimization performed in the local map to the global map. In this case, an order where the local map and the global map are optimized is not limited thereto.

Further, after the optimization for the local map and the global map is performed, the map generator 810 of the apparatus 800 for producing the map based on the hierarchical structure according to an embodiment of the inventive concept may remove a node constraint included in a generated local map and may generate a local map again using a change node constraint between nodes changed according to the optimization. The optimization performing unit 820 may produce a 3D optimization map from the local map generated again.

For example, if optimization for the local map and the global map is performed by the optimizing performing unit 820, an error of odometry information included in the local map may be minimized or removed to change a plurality of nodes. Thus, the map generator 810 may remove a node constraint connected to a plurality of nodes which form an old local map, based on the optimization performed by the optimization performing unit 820 and may generate a local map based on a graph-structure including a change node constraint again by applying an ICP algorithm to nodes changed according to the optimization. Thereafter, the map generator 810 may generate a global map again according to the local map generated again.

In other words, the apparatus 800 for producing the map based on the hierarchical structure according to an embodiment of the inventive concept may enhance accuracy of an optimization map by repeating that the map generator 810 generates a local map and a global map again based on inter-layer repeated optimization of the local map and the global map of the optimization performing unit 820.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Program instructions include both machine code, such as produced by a compiler, and files containing higher level code that may be executed by the computer using an interpreter. The described hardware devices may be configured to act as one or more software modules to perform the operations of the above-described exemplary embodiments of the inventive concept, or vice versa.

According to an embodiment of the inventive concept, a 3D high-precision map may be produced using a low-priced 2D laser scanner.

Further, according to an embodiment of the inventive concept, a 3D map may be accurately generated through a local map according to a movement path of a mobile robot and repeated optimization according to an inter-layer correction between the local map and a global map of a hierarchical structure form.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A method for producing a map based on a hierarchical structure, the method comprising:
   generating a local map based on information received from sensors on a mobile robot and on nodes formed on a movement path of the mobile robot, the information comprising a magnetic field measurement, wherein the magnetic field measurement is obtained at least in part by a rotation of the mobile robot without any translational displacement of the robot;
   generating a global map in the form of the hierarchical structure in the local map by grouping the nodes; and
   producing an optimization map through inter-layer repeated optimization of the local map and the global map.

2. The method of claim 1, wherein the generating of the local map comprises:
   forming the nodes using sensor information measured from a two-dimensional (2D) push-broom light detection and ranging (LiDAR) of the mobile robot according to the movement path of the mobile robot and odometry information of the mobile robot.

3. The method of claim 2, wherein the generating of the local map comprises:
   generating the local map of a graph-structure using a node constraint of the nodes accumulated according to movement of the mobile robot.

4. The method of claim 1, wherein the generating of the global map comprises:
   forming super nodes by grouping the nodes formed on the movement path of the mobile robot, which form the local map, at a predetermined time interval; and
   generating the global map by connecting the formed super nodes.

5. The method of claim 4, wherein the generating of the global map comprises:
   generating the global map using a loop closing constraint of the super nodes, the loop closing constraint being generated based on the magnetic field measurement for the nodes formed on the movement path of the mobile robot.

6. The method of claim 1, wherein the producing of the optimization map comprises:
   performing optimization of one of the local map and the global map using a hierarchical constraint; and
   performing optimization of another one of the local map and the global map.

7. The method of claim 6, wherein the producing of the optimization map comprises:
   producing a three-dimensional (3D) optimization map by performing optimization by applying the performed optimization of one of the local map and the global map to the other.

8. A method for producing a map based on a hierarchical structure, the method comprising:
   generating a local map based on information received from sensors on a mobile robot and on nodes formed on a movement path of the mobile robot, the information comprising a magnetic field measurement, wherein the magnetic field measurement is obtained at least in part by a rotation of the mobile robot without any translational displacement of the robot;
   generating a global map in the form of the hierarchical structure by grouping the nodes;
   performing inter-layer repeated optimization of the local map and the global map; and
   producing an optimization map based on a local map generated again according to the optimization.

9. The method of claim 8, wherein the performing of the inter-layer repeated optimization comprises:
   performing optimization of one of the local map and the global map using a hierarchical constraint; and
   performing optimization of another one of the local map and the global map.

10. The method of claim 9, wherein the producing of the optimization map comprises:
    after the optimization for the local map and the global map is performed, removing a node constraint included in the generated local map and producing a three-dimensional (3D) optimization map from the local map generated again, using a change node constraint between nodes changed according to the optimization.

11. An apparatus for producing a map based on a hierarchical structure, the apparatus comprising:
    a map generator device configured to generate a local map based on information received from sensors on a mobile robot and on nodes formed on a movement path of the mobile robot, and generate a global map in the form of the hierarchical structure by grouping the nodes, the information comprising a magnetic field measurement, wherein the magnetic field measurement is obtained at least in part by a rotation of the mobile robot without any translational displacement of the robot; and
    an optimization performing device configured to produce an optimization map by performing inter-layer repeated optimization of the local map and the global map.

12. The apparatus of claim 11, wherein the map generator device is configured to:
    generate the local map of a graph-structure using a node constraint of the nodes accumulated from sensor information measured from a two-dimensional (2D) push-broom light detection and ranging (LiDAR) instrument of the mobile robot according to the movement path of the mobile robot and the odometry information of the mobile robot.

13. The apparatus of claim 12, wherein the map generator device is configured to:
    form super nodes by grouping the nodes, which form the local map, at a predetermined time interval; and
    generate the global map using a loop closing constraint of the formed super nodes, the loop closing constraint being generated based on the magnetic field measurement for the nodes formed on the movement path of the mobile robot.

14. The apparatus of claim 11, wherein the optimization performing device is configured to:
    produce a three-dimensional (3D) optimization map by performing optimization of one of the local map and the global map using a hierarchical constraint and performing optimization of another one of the local map and the global map.

15. The apparatus of claim 14, wherein the map generator device is configured to:
    after the optimization for the local map and the global map is performed, remove a node constraint included in the generated local map and generate a local map again using a change node constraint between nodes changed according to the optimization, and
    wherein the optimization performing device is configured to:
    produce the 3D optimization map from the local map generated again.

16. The apparatus of claim 11, further comprising:
    an encoder configured to obtain odometry information of the mobile robot, wherein the map generator is configured to: generate the local map based on the obtained odometry information.

* * * * *